Dec. 20, 1960 M. LEVECQUE ET AL 2,964,786
METHOD OF AND APPARATUS FOR PRODUCING
FIBERS FROM THERMOPLASTIC MATERIAL
Filed July 26, 1957 2 Sheets-Sheet 1
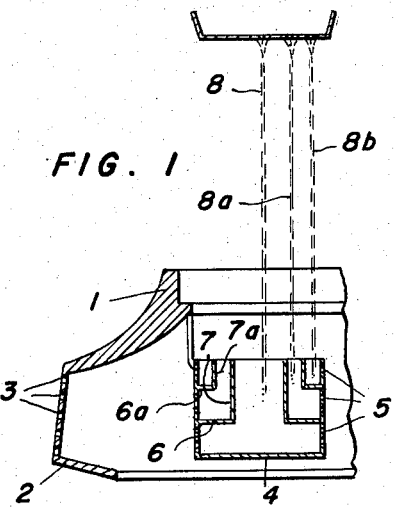
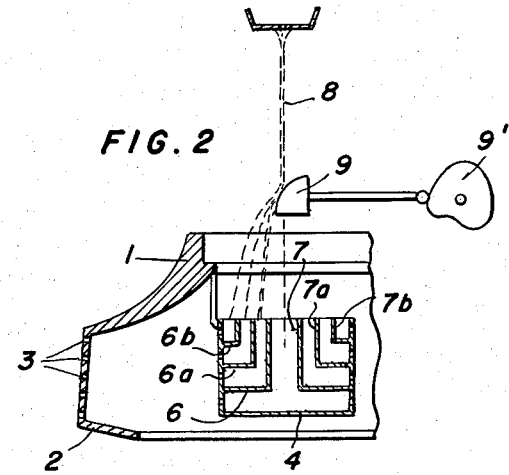
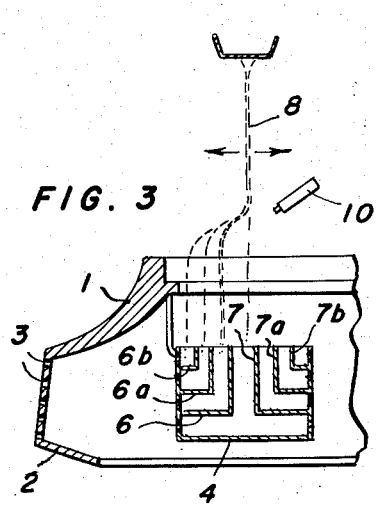
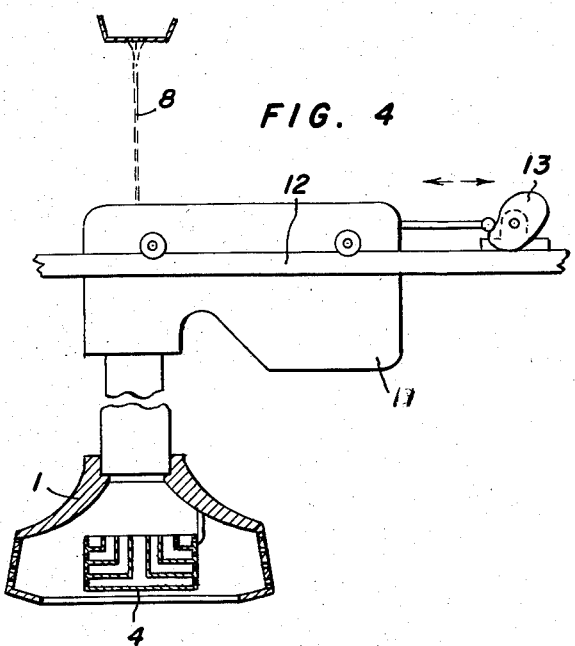
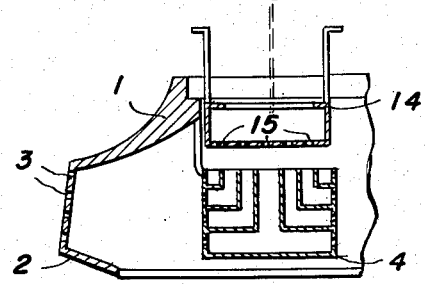
INVENTORS
MARCEL LEVECQUE &
PAUL PIOT
BY
ATTORNEY Dec. 20, 1960 M. LEVECQUE ET AL 2,964,786
METHOD OF AND APPARATUS FOR PRODUCING
FIBERS FROM THERMOPLASTIC MATERIAL
Filed July 26, 1957 2 Sheets-Sheet 2
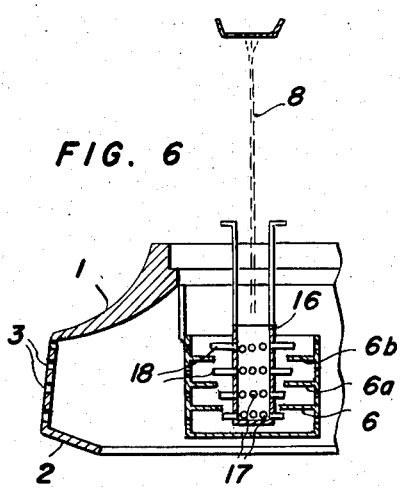
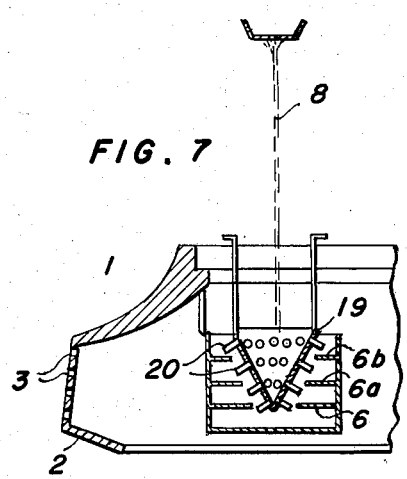
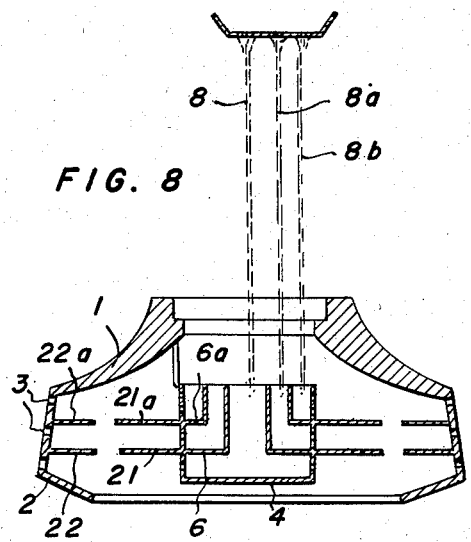
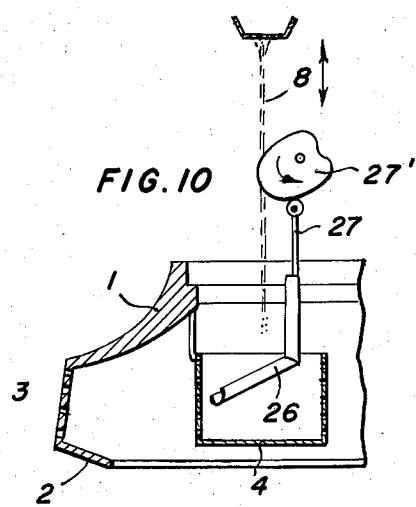
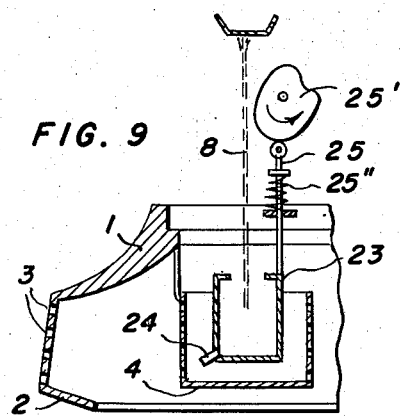
INVENTORS
MARCEL LEVECQUE
& PAUL PIOT
ATTORNEY

United States Patent Office 2,964,786
Patented Dec. 20, 1960

2,964,786

METHOD OF AND APPARATUS FOR PRODUCING FIBERS FROM THERMOPLASTIC MATERIAL

Marcel Levecque, Saint-Gratien, and Paul Piot, Deuil, France, assignors to Societe Anonyme des Manufactures des Glaces & Produits Chimiques de Saint-Gobain, Chauny & Cirey, Paris, France, a corporation of France Filed July 26, 1957, Ser. No. 674,522

Claims priority, application France Aug. 3, 1956

11 Claims. (Cl. 18—2.5)

The present invention is concerned with improvements of the inventions disclosed in application Serial No. 567,024, filed February 21, 1956, and consists in providing, inside the rotating body or centrifuge which projects the melted material through orifices on the periphery of the body, a distributor which receives the supply stream or fillet of melted material and which projects the material under action of centrifugal force, distributing it in uniform fashion over the whole surface of the band or wall having the projection orifices, so as to create a coating of relatively uniform thickness, by virtue of which all the orifices are supplied in a practically identical manner.

The invention relates particularly to one of the modes of execution described in the above-mentioned application, according to which the distributor consists of a hollow body or reservoir located inside the centrifuge and having at its periphery projection orifices through which the material is projected in a divided state, to supply the orifices of the centrifuge.

It is the object of the instant invention to assure homogeneous distribution of the melted material over the entire height of the peripheral part of the reservoir containing the projection orifices.

By virtue of the present improvement it is possible to obtain a homogeneous and regular supply to all the orifices of a centrifuge having a large number of rows in the peripheral wall thereof.

According to one embodiment of the invention, the hollow body or reservoir is divided into a certain number of superposed parts or compartments each one supplied separately. With this division of the reservoir in the direction of elevation, one secures substantially identical projection of the material, no matter what the number of rows of orifices which may be provided in the peripheral wall of the centrifuge.

According to another mode of execution, a device is provided inside the reservoir which is driven back and forth in a vertical direction to distribute the melted material regularly and uniformly over the entire height of the reservoir.

Some methods of realization of the improvements according to the invention are described below by way of example, and not in a limiting sense.

In the following description reference is made to the attached drawings wherein—

Fig. 1 is a cross-section of the first embodiment of the invention;

Figs. 2 to 4 are cross-sections with some parts in elevation of variations of the embodiment shown in Fig. 1;

Figs. 5 to 7 are cross-sections of other embodiments according to which there is provided between the source of the melted material and the reservoir, an intermediate receiver assuring the proper distribution of the material into the several tiered compartments of the reservoir;

Fig. 8 is a cross-section of still another form of execution; and

Figs. 9 and 10 are cross-sections of forms of execution according to which the distribution of the material in the reservoir is obtained by means of an element impelled by a to-and-fro movement in a vertical direction.

In the several forms of execution illustrated in the drawings, the centrifuge 1 includes a peripheral cylindrical part or wall 2, in which are provided a large number of rows of projection orifices 3, for example, twenty to thirty rows.

Inside the centrifuge is provided a reservoir 4, which has a certain number of rows of orifices 5 on its periphery such that the melted material brought inside the reservoir is projected through orifices 5 over the entire height of the inner face of the wall or band 2.

As shown in Fig. 1, the reservoir 4 has horizontal partitions 6, 6a in conjunction with vertical partitions 7, 7a, respectively, which define several superposed compartments, for example, three in the form of execution shown in this figure. These compartments are supplied separately by streams of material 8, 8a, and 8b. Each of these compartments forms an elementary reservoir assuring homogeneous distribution over the height of the band 2 at its respective level. If the other parts of the compartments are the same height and are supplied in the same way, the peripheral wall 2 will be supplied in a uniform and regular manner over its entire height.

In the variation shown in Fig. 2, the supply of melted material is obtained from a single stream 8 and there is provided an element 9 in the form of a guide to which is imparted a horizontal back and forth movement by a cam 9' to assure distribution of the material in each of the compartments of the reservoir. The shape of the cam 9' should be such as to accord to the guide 9 a motion which imparts a traverse of uniform duration across each of the three compartments.

In the variation shown in Fig. 3, the distribution of melted material in each compartment of the reservoir is obtained by means of a gas jet produced by discharge tube 10 which acts on supply stream 8 according to a variable intensity in order to bring it successively into each of the said compartments for projection by centrifugal force from the apertured lateral wall of the reservoir.

Instead of influencing the direction of the supply stream 8 of melted material, the position of the reservoir with respect to the supply stream 8 may be varied, as shown in Fig. 4. In this case, the centrifuge 1, with its compartmented reservoir 4 and rotation device, is mounted on a frame 11 rolling on rails 12, which frame is subjected to a horizontal back-and-forth movement by a movable control device 13 in the form of a driven cam. As in the case of the cam 9', the cam 13 is so shaped as to accord to frame 11 a motion which is cyclically uniform for the four compartments in reservoir 4 relative to the fixed supply stream 8. The amplitude of this movement is such that all the compartments of reservoir 4 are supplied successively and uniformly.

In the forms of execution shown in Figs. 2 to 4, distribution of the material is assured in the different compartments of the reservoir by a relative displacement of the supply stream 8 and the compartments of the reservoir. To obtain this distribution, an intermediary organ in the form of a perforated pannier or basket may also be utilized.

One such device is shown in Fig. 5, wherein a receptacle or pannier 14 with perforated base 15 is placed above the compartmented reservoir 4. The stationary basket 14 receives the supply stream 8 of the molten material and subdivides the latter through the openings 15 so that the multiple streamlets fall in the different compartments of the reservoir.

In the variation of Fig. 6, the pannier 16 is placed inside the reservoir which is provided with horizontal partitions 6, 6a, and 6b only. This pannier has on its vertical wall, openings 17 prolonged by discharge tubes 18 arranged to supply material to each of the compartments of the reservoir. As shown in this figure, the horizontal partitions may be stepped with the tubular extensions stepped correspondingly in an inverse relation.

Instead of a cylindrical pannier such as represented in Fig. 6, a pannier 19 of conic form may be used, as shown in Fig. 7. In this case discharge pipes 20 may be directed downwardly in an oblique direction and the reservoir may have horizontal annular partitions 6, 6a, and 6b with internal diameters increasing from bottom to top.

As shown in Fig. 8 which has a device similar to that of Fig. 1 for furnishing multiple supply streams 8, 8a and 8b, one can provide rings 21 and 21a on the periphery of the reservoir 4 in the prolongation of partitions 6 and 6a, respectively. Similarly, annular pieces 22 and 22a located respectively in the planes or rings 21 and 21a may be provided on the inner side of peripheral wall 2.

In the forms of execution of Figs. 9 and 10, the reservoir is not divided into tiered compartments as in the embodiments described above, and the regular and uniform distribution of the molten plastic material on its lateral surface is obtained by means of a distributing member impelled by a vertical back-and-forth movement.

As shown in Fig. 9, this distributing member may consist of a small fixed receptacle 23 placed in the reservoir 4 which receives the supply stream 8 of the material. This receiver 23 has at its lower part a discharge pipe 24 through which the material flows over the wall of reservoir 4. The receiver 23 may be connected with a device 25 and an actuating cam 25' to impart a reciprocating movement to the former of an amplitude which is substantially equal to the height of the reservoir, so that a regular and uniform coating of material is formed over the entire height of its lateral wall. A spring may be associated with elements 25 and 25' and the shape of the latter should be such as to accord to the feeding spout 24 a motion to deliver the melted plastic material substantially throughout the height of the vertical wall of the distributor 4.

In the variation shown in Fig. 10, the distributing member consists of a liquid channel or trough 26 moved to-and-fro in a vertical direction by a device 27 connected with cam 27', which channel distributes the molten material over the entire height of reservoir 4. The shape of cam 27' should be such as to impart the desired cyclic reciprocating movements to trough 27 to feed the material onto the entire lateral wall of the reservoir.

What is claimed is:

1. An apparatus for producing fibers from thermoplastic material comprising a centrifuge rotating on a vertical axis and having a peripheral wall of a substantial height with respect to its diameter and bearing a plurality of superposed rows of orifices for discharging the material therethrough by centrifugal force, a rotary reservoir within said centrifuge, having also a lateral wall of substantial height with respect to its diameter, bearing a plurality of rows of openings and spaced a substantial distance from the peripheral wall of the centrifuge, means for feeding the thermoplastic material to said reservoir for discharge from said openings, means located within said reservoir to facilitate a homogeneous distribution of the molten material on all the periphery of said reservoir, whatever may be the height of its peripheral wall, and means for actuating said reservoir at least rotationally to project the material therefrom to deposit a substantially uniform layer thereof on the inner face of the peripheral wall of the centrifuge and overlying all the rows of orifices therein.

2. An apparatus for producing fibers from thermoplastic material comprising a centrifuge rotating on a vertical axis and having a peripheral wall provided with a plurality of superposed rows of orifices for discharging the material therethrough by centrifugal force, a rotary reservoir within said centrifuge provided with a plurality of vertically tiered compartments and having openings in the lateral wall thereof in communication with said compartments spaced a substantial distance from said peripheral wall, means for feeding the thermoplastic material to said tiered compartments of the reservoir for discharge from said openings, and means for rapidly rotating said reservoir to project the material from the compartments and openings in the lateral wall of the reservoir to deposit a substantially uniform layer thereof on the inner face of said peripheral wall and overlying all the rows of orifices therein.

3. An apparatus as set forth in claim 2 wherein said feeding means for said plastic material comprises a plurality of passages communicating with said compartments in the path of a plurality of supply streams of said material.

4. An apparatus as set forth in claim 2 wherein said feeding means for said plastic material comprises a plurality of passages communicating with said compartments, and means for relatively moving said passages and a unitary supply stream thereover.

5. An apparatus as set forth in claim 2 wherein said feeding means for said plastic material comprises a plurality of passages communicating with said compartments, and means for cyclically moving said supply stream over said passages.

6. An apparatus as set forth in claim 4 wherein said last-mentioned means comprises a laterally shiftable frame supporting said centrifuge, reservoir and rotating mechanism therefor, and means for cyclically shifting said frame relative to a fixed source of supply of thermoplastic material.

7. An apparatus for producing fibers from thermoplastic material comprising a centrifuge rotating on a vertical axis and having a peripheral wall provided with a plurality of superposed rows of orifices for discharging the material therethrough by centrifugal force, a rotary reservoir within said centrifuge provided with a plurality of vertically tiered compartments and having openings in the lateral wall thereof spaced a substantial distance from said peripheral wall, a perforated receptacle for feeding the thermoplastic material to the plurality of compartments within said reservoir for discharge from said openings, and means for rapidly rotating said reservoir to project the material therefrom to deposit a substantially uniform layer thereof on the inner face of said peripheral wall and overlying all the rows of orifices therein.

8. An apparatus as set forth in claim 7 wherein said perforated receptacle is of cylindrical form having a circular perforated bottom disposed above said reservoir.

9. An apparatus as set forth in claim 7 wherein said perforated receptacle extends into said reservoir and is provided with outlets in the lateral wall thereof, tubular extensions on the exterior of said wall at said outlets, and horizontal annular partitions on the inner wall of said reservoir defining said compartments for directing the thermoplastic material issuing from said tubular extensions.

10. An apparatus for producing fibers from thermoplastic material comprising a centrifuge rotating on a vertical axis and having a peripheral wall provided with a plurality of superposed rows of orifices for discharging the material therethrough by centrifugal force, a rotary reservoir within said centrifuge having openings in the lateral wall thereof spaced a substantial distance from said peripheral wall, means for cyclically directing thermoplastic material along the height of said reservoir for discharge from said openings, and means for rapidly rotating said reservoir to project the material therefrom to deposit a substantially uniform layer thereof on the inner face of said peripheral wall and overlying all the rows of orifices therein.

11. An apparatus for producing fibers from thermoplastic material comprising a centrifuge rotating on a vertical axis having a peripheral wall provided with a plurality of superposed rows of orifices for discharging the material therethrough by centrifugal force, a rotary reservoir within said centrifuge provided with vertically tiered compartments and having openings in the lateral wall thereof spaced a substantial distance from said peripheral wall, means for feeding the thermoplastic material to said reservoir for discharge from said openings, means for rapidly rotating said reservoir to project the material therefrom, horizontal annular partitions on the outside of said reservoir at the junctions between said compartments, and aligned horizontal annular partitions on the inside of said peripheral wall to facilitate the deposit of a substantially uniform layer of the material on the inner face of said peripheral wall and overlying all the rows of orifices therein.

References Cited in the file of this patent

UNITED STATES PATENTS

| | | |
|---|---|---|
| 2,431,205 | Slayter | Nov. 18, 1947 |
| 2,624,912 | Heymes et al. | Jan. 13, 1953 |
| 2,816,826 | Brennan | Dec. 17, 1957 |
| 2,839,782 | Tillotson | June 24, 1958 |

FOREIGN PATENTS

| | | |
|---|---|---|
| 202,877 | Australia | July 5, 1956 |
| 1,124,488 | France | July 2, 1956 |